United States Patent [19]

Alie et al.

[11] Patent Number: 4,567,547
[45] Date of Patent: Jan. 28, 1986

[54] AIR AND LIGHT UTILITY ASSEMBLIES

[75] Inventors: Enrique Alie, Brooklyn; Arthur H. Gilmore, New York, both of N.Y.; Henry J. Mack, Jr., Levittown, Pa.

[73] Assignee: Falcon Jet Corporation, Teterboro, N.J.

[21] Appl. No.: 655,709

[22] Filed: Sep. 28, 1984

[51] Int. Cl.[4] .............................................. F21V 33/00
[52] U.S. Cl. ...................................... 362/154; 362/64
[58] Field of Search .................... 362/154, 63, 64, 65, 362/66, 70, 372, 373, 427, 428

[56] References Cited

U.S. PATENT DOCUMENTS

| | | | |
|---|---|---|---|
| 1,606,200 | 11/1926 | Williams | 362/373 |
| 2,099,362 | 11/1937 | Harley | 362/63 |
| 2,360,461 | 10/1944 | Ackerman | 362/64 |
| 2,388,788 | 11/1945 | Kuschel | 362/64 |
| 4,437,143 | 3/1984 | Hayashi | 362/427 |

FOREIGN PATENT DOCUMENTS 1361555  4/1964  France ................................. 362/428

Primary Examiner—Ronald H. Lazarus
Attorney, Agent, or Firm—Morgan, Finnegan, Pine, Foley & Lee

[57] ABSTRACT

An assembly for disposing passenger compartment air outlet and reading light units in either a first exposed orientation or a second hidden orientation includes a utility unit, providing unit support means and actuating means linked via linkage means to pivoting unit support means, the actuating means actuating the linkage means to dispose the unit supporting means in either an exposed or hidden orientation about a pivot point. In the exposed orientation, the utility unit may provide light or air functions to the passenger depending on the utility provided within the supporting means. In the hidden orientation, the respective air or light unit is hidden from the view of the passenger and a substantially contiguous surface of the unit supporting means is instead presented.

8 Claims, 5 Drawing Figures

AIR AND LIGHT UTILITY ASSEMBLIES

BACKGROUND OF THE INVENTION

The invention relates to vehicular passenger utility assemblies. More particularly, the invention relates to air and reading light assemblies of the type provided for passengers on board aircraft, trains and the like.

It has long been known to provide air outlets and adjustable reading lights for vehicular passenger comfort and convenience. U.S. Pat. No. Design 213,144 to Kraus et al (1969), entitled Utilities Module For Aircraft Cabin Interior, discloses an airplane utility module presumably including air outlets and reading lamps. Similarly, U.S. Pat. No. Design 244,442 to Greiss et al (1977), entitled Combined Wall and Ceiling for Aircraft, likewise illustrates what are believed to be air and light assemblies as they are typically oriented along the walls or ceilings of an aircraft.

U.S. Pat. Nos. 2,974,580 (Zimmerman et al 1961), 3,113,502 (Kallel et al 1963), 2,516,805 (Rother et al 1950), and 4,142,227 (Aikens 1979) all disclose passenger air ventilation units such as are typically found onboard aircraft. Aikens (U.S. Pat. No. 4,142,227) in particular discloses a combination unit including both passenger reading light and air ventilation functions. Thus, air outlets and reading light assemblies have long been provided in vehicular passenger compartments, such as in aircraft cabins.

It is also known to make passenger reading lights and utilities adjustable to provide convenient passenger use thereof. See, for example, U.S. Pat. No. 3,370,813 to Albertine et al (1968) entitled Adjustable Passenger Reading Lights and Utilities, which discloses a utilities panel which folds down to provide enhanced passenger access.

As may be seen from all of the above discussed patent references, air outlet and reading light assemblies of the type commonly found in passenger compartments such as in aircraft cabins, typically either protrude from the otherwise contiguous surface of the cabin walls or ceilings or are recessed therefrom leaving a cut-away space which likewise disrupts the smooth configuration of the cabin wall or ceiling.

Although it has long been known to provide retractable headlight systems for automobiles (See, for example, U.S. Pat. Nos. 2,119,892, 2,999,150, 3,310,669, 2,312,005, 4,246,628, and 4,380,789) it has not heretofore been known to provide retractable air and light utility units within the passenger compartments of vehicles. It has likewise not heretofore been known to provide retractable air and light units within the passenger compartment of an aircraft, whereby the utility unit may be concealed or hidden from view when it is not in use while simultaneously leaving behind a contiguous and smooth surface about the interior wall or ceiling of an aircraft cabin which would otherwise be disrupted.

As is well known in the aircraft interior design field, space and weight requirements are paramount concerns. Therefore, designers who seek to advance the state of the aircraft interior design art are often unable to apply conventional techniques to provide desirable luxuries for aircraft passengers.

It is therefore an object of the invention to provide an assembly for orienting air outlets or reading light units in either an exposed orientation or a hidden orientation.

It is a further object of the invention to provide a switch actuated assembly for automatically disposing passenger compartment air and light utility units in either an exposed or a hidden configuration.

It is a further object of the invention to provide an assembly for exposing and hiding air and light utility units which will fit within a narrow contour and satisfy rigid aircraft space and weight requirements.

SUMMARY OF THE INVENTION

These and other objects of the invention are met by providing a utility assembly comprising a utility supporting unit having a first exposing face and a second concealing face, linear actuating means, linkage means for linking the utility supporting unit and the linear actuating means, and pivoting supporting means for pivotally supporting the utility supporting unit, wherein when actuated, the actuating means actuates the linkage means to reveal either the first exposing face or the second concealing face. The utility unit may further comprise an air outlet or a reading light. In its open configuration, the utility unit can provide air (or light) functions to the passenger. In its hidden position, the utility unit presents its concealing face to the passenger compartment which cooperates in forming a substantially contiguous surface with the surrounding wall or ceiling.

BRIEF DESCRIPTION OF THE DRAWINGS

The invention will be more fully described herein by way of reference to the following drawings, in which.

DETAILED DESCRIPTION OF THE DRAWINGS

Figure 1:
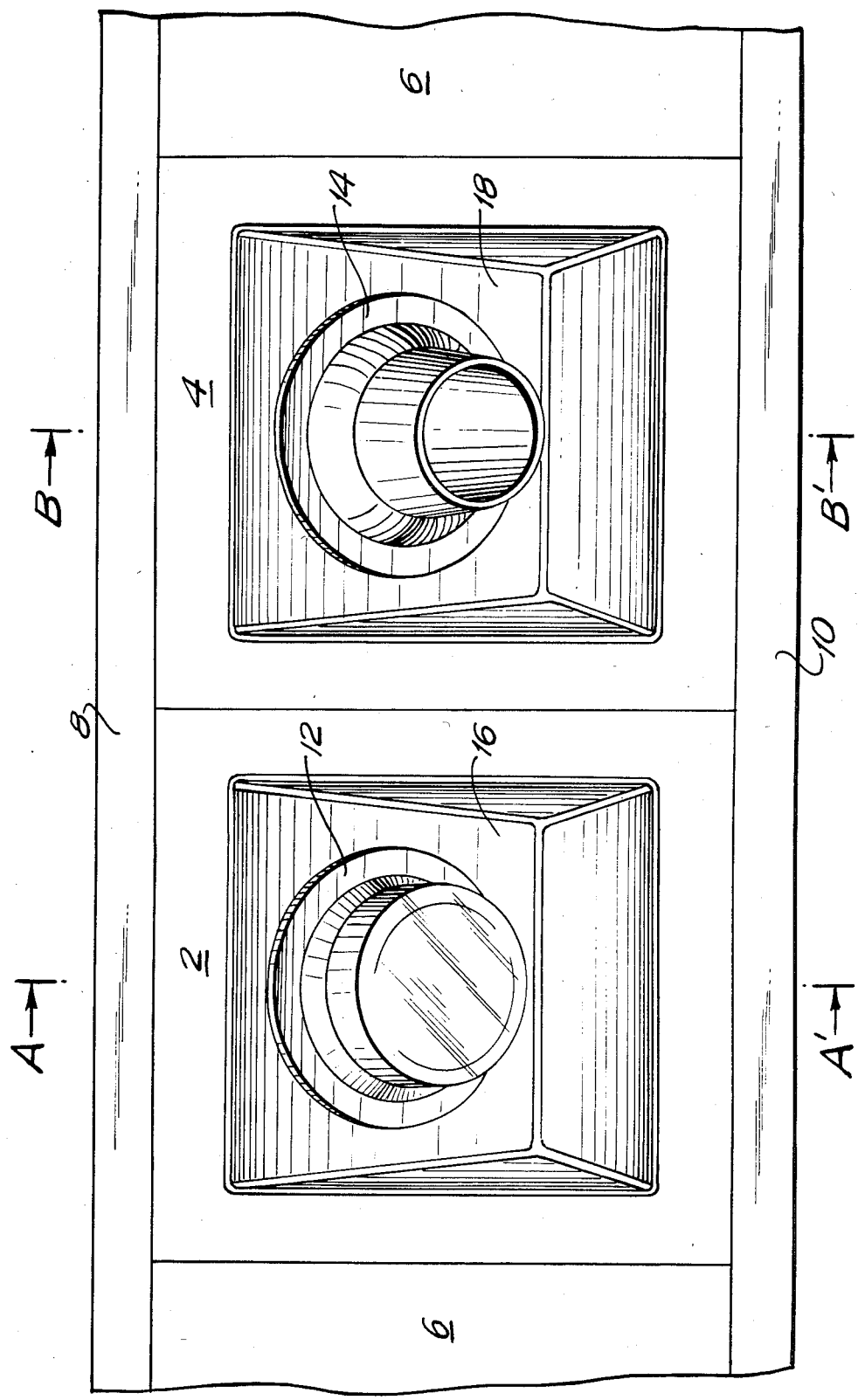
FIG. 1 is a perspective drawing of a reading light unit and an air unit in their exposed configuration in accordance with the instant invention.

FIG. 1 illustrates reading light 12 and air outlet 14 in their exposed position according to the instant invention. Reading light 12 and air outlet 14 are shown as they would appear to a passenger when the reading light 12 and backing plate 16, and the air outlet 14 and air outlet backing plate 18, are in their exposed orientation according to the invention.

FIG. 1 also illustrates upper edge extrusion 8 and lower edge extrusion 10 as they would appear above and below, respectively, the light 12 and air 14 utilities. Upper edge extrusion 8 and lower edge extrusion 10 further bracket service panel 6 which may provide further air or light utilities or other services along its length.

Mating surface 2 is provided about reading light assembly 12 and supporting bracket 16 and provides a contiguous surface following the contour of the service panel 6 and, as will be described below by way of reference to FIGS. 2 through 4, further provides a contiguous surface with the reading light supporting assembly when the reading light 12 is in its hidden orientation. Similarly, mating surface 4 cooperates in providing a contiguous surface about edges 8, 10, mating surface 2, surface panel 6 and the air outlet support when the air outlet 14 is in its hidden orientation.

Figure 2:
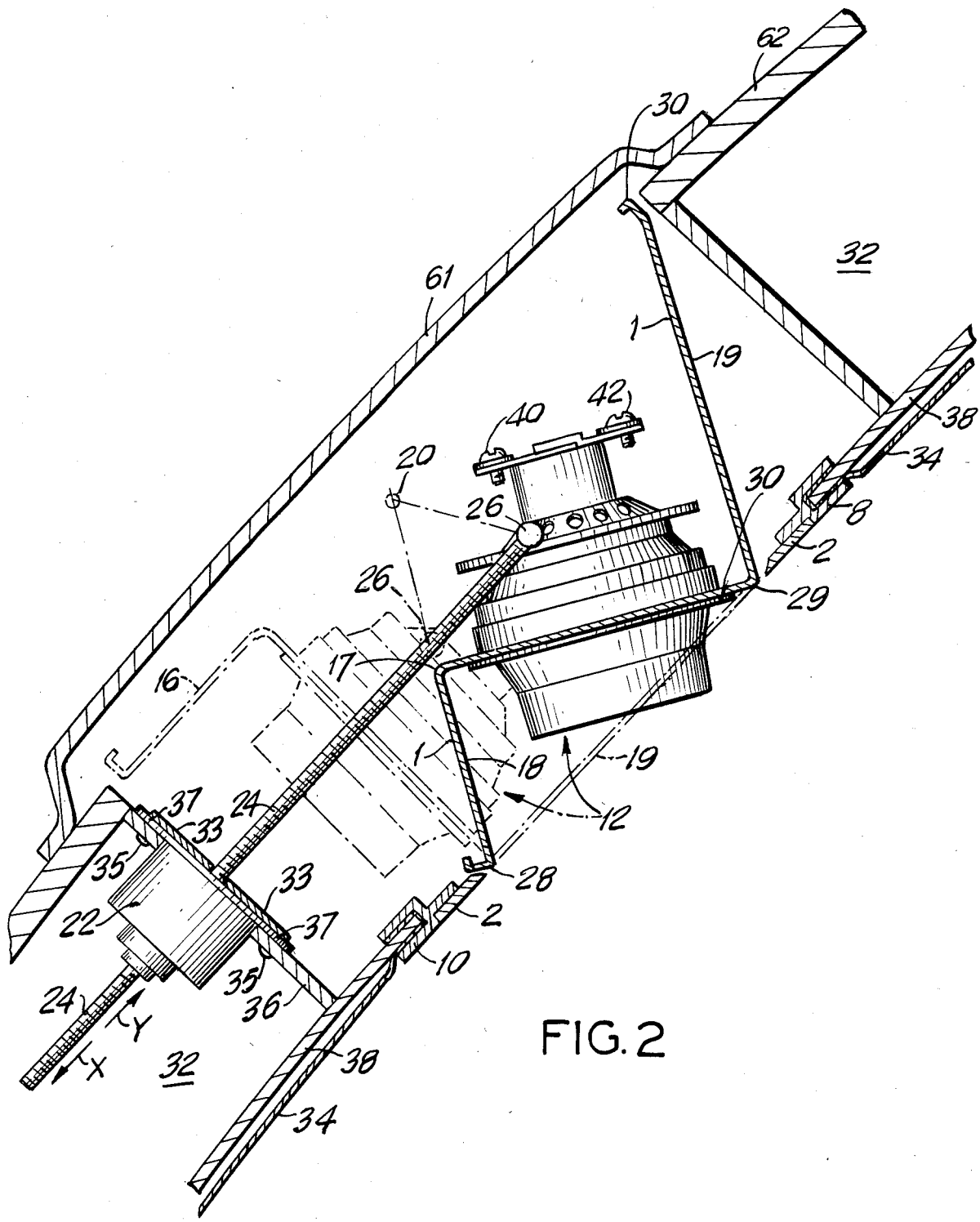
FIG. 2 is a cut-away drawing taken along the line A–A' of FIG. 1 and illustrating a reading light assembly in accordance with the instant invention.

FIG. 2 is a cut-away drawing taken along the line A—A' of FIG. 1 and illustrates a preferred reading light utility assembly according to the instant invention. Similarly, FIG. 3 is a cut-away drawing taken along the line B—B' of FIG. 1 and illustrates a perferred air outlet assembly in accordance with the instant invention. For greater clarity of explantion, like functioning components between the disclosed reading light assembly (FIG. 2) and air outlet assembly (FIG. 3) are referenced by the same numerals in FIGS. 2 and 3. FIG. 4, which will be described in greater detail below, and which illustrates a partially exploded view of the reading light assembly of FIGS. 1 and 2, likewise bears common reference numerals for the respective components disclosed in FIGS. 2 and 3.

FIG. 2 shows a reading light assembly in its open orientation and, in phantom, in its closed orientation in accordance with the instant invention. Particularly, FIG. 2 illustrates a reading light 12 of a known configuration comprising positive and negative electrical connections 40, 42. Reading light 12 is mounted within bracket 1 and secured thereto by retaining ring 30. Bracket 1 is a planer section of, e.g. lightweight metal having a first 90° bend at a point 29 such that the distance 19 from a first end 30 of said planer support 1 to said first perpendicular bend point 29 is substantially equivalent to the distance between the opening provided between retaining surfaces 2 so that effective closure will take place when the assembly is in its hidden or closed configuration.

In the embodiment illustrated in FIG. 2, planer support bracket 1 is provided with two perpendicular bends, one each at points 29 and 17. Reading light assembly 12 is secured to planer bracket 1 between the two perpendicular bends of planer bracket 1, i.e., between points 29 and 17. The ends 28 and 30 of said planer support 1 which at separate times abut meeting surfaces 2 are provided with return flanges to stiffen the edge and more completely seal the opening when the respective end is adjacent surface 2.

Second perpendicular bend point 17 is chosen such that the hypotenuse of the angle formed thereby is substantially equivalent to the distance between mating surfaces 2. The distance between perpendicular bend point 17 and 29 must be sufficiently large to accomodate reading light 12 but must be no wider than the depth allotted for the light assembly within the service panel when the light assembly is disposed in its hidden or closed orientation as shown in phantom in FIG. 2. Although an extension 61 may be provided from fuselage backing structure 62 to accomodate the depth of the light assembly, it is clear that such an extension will be unnecessary in many instances and is not part of the invention claimed herein.

FIG. 2 further illustrates linkage means comprising link rod 24 and linkage attachment means 26 rigidly secured respective reading light 12. Rod 24 will bend slightly (not shown) as light 12 is drawn to its hidden configuration.

Linkage means push rod 24 is functionally disposed within linear actuating means 22 such as Airpax No. LB92121-P2. The linear actuating means 22 may include brace 37 and may be fastened through ductwork 36 on support plate 33 and across brace 37 via fastening means 35. Linear actuator 22 must remain fixed respective the light 12 and bracket 1 but may be mounted either through the ductwork 36 or fixed to a bracket 13 (FIG. 4) previously secured to the assembly itself and simply fitted into ductwork 36. FIG. 4 illustrates the latter embodiment including the linear actuator 22, supporting bracket 13 and the associated fastening means 35 and fastening plate 37. Since the linear actuator may be secured to supporting bracket 13 prior to installation, this embodiment may offer the advantage of easier installation.

FIG. 2 further illustrates pivot point 20 for providing a pivoting radius for the reading light assembly according to the instant invention. The function of pivot point 20, about which supporting bracket 1 is pivotally secured, will be described below.

As previously stated, FIG. 2 illustrates in bold lines reading light 12 and supporting bracket 1 in their exposed or open orientation according to the instant invention. In such an orientation, the light emitting end of the reading light mechanism 12 is exposed to the passenger compartment as is the surrounding indented L-shaped portion 16 of planer support bracket 1. Further, when exposed, the light emitting end of reading light 12 extends beyond mating surface 2 and into the surrounding airspace of the cabin interior.

FIG. 2 also illustrates, in phantom, the reading light 12 and supporting bracket 1 in a hidden orientation in accordance with the instant invention. As is clearly seen from the phantom lines of FIG. 2, when the light 12 and supporting bracket 1 are in their hidden or closed orientation, the hiding portion 19 of the planer supporting bracket 1 fits within the space between mating surfaces 2 thereby providing a substantially contiguous surface along the service panel and surrounding wall or ceiling 34.

The reading light 12 and planer support bracket 1 are disposed between their first exposed configuration and their second hidden configuration by the operation of linear actuating means 22, push rod 24, linkage means attachment component 26 and central pivoting point 20 as follows. Assuming that the reading light 12 and supporting bracket 1 are in their first exposed configuration, a linear retracting of pushrod 24 by linear actuating means 22 will simultaneously retract linkage attachment member 26 which is rigidly connected respective to reading light 12. Pushrod 24 will be retracted in the direction X of FIG. 2. Simultaneously, linkage attachment member 26 will pull reading light 12 in the X direction. However, since supporting bracket 1 is pivotally connected about pivot point 20, supporting bracket 1 and reading light 12 will be pivoted about pivot point 20 thereby tilting the axis of reading light 12 as the pushrod is withdrawn in the X direction. During this operation, linkage pushrod 24 bends slightly towards pivot point 20 hereby allowing reading light 12 to shift its axis in the outboard direction as they are both being drawn in the X direction.

As the linear actuating means 22 completes the cycle of withdrawing pushrod 24 in the X direction, reading light mechanism 12 is fully retracted within the service panel and the hiding surface planer component 19 of planer support bracket 1 substantially contiguously fills the gap between mating surfaces 2, thereby providing a smooth contiguous surface appearance along the interior wall including wall surfaces 34, edge extrusions 8 and 10, and mating surfaces 2.

Likewise, when the reading light 12 and supporting bracket 1 are in their hidden orientation with the reading light mechanism 12 being retracted and hiding surface planer component 19 aligned between mating surfaces 2, the linear actuating means 22 may advance pushrod 24 in a forward direction illustrated by Y in FIG. 2. Advancing pushrod 24 in the forward Y direction when the reading light assembly 12 and supporting bracket 1 are in their hidden orientation will cause linkage attachment component 26 to advance reading light 12 in the forward Y direction. However, since the reading light mechanism 12 is also acting under the influence of pivot point 20, the axis of reading light 12 will shift to follow pivot point 20 thereby once again exposing the reading light 12 and the surrounding exposed portion 16 of planer support bracket 1. Push rod 24 will relax as it is extended in the Y direction.

When linear actuating means 22 has advanced reading light 12 and planer supporting bracket 1 to their fully exposed position, bottom bracket end 28 and first perpendicular bend point 29 substantially abut closure surfaces 2 thereby providing a substantially solid, non-contiguous surface.

Figure 3:
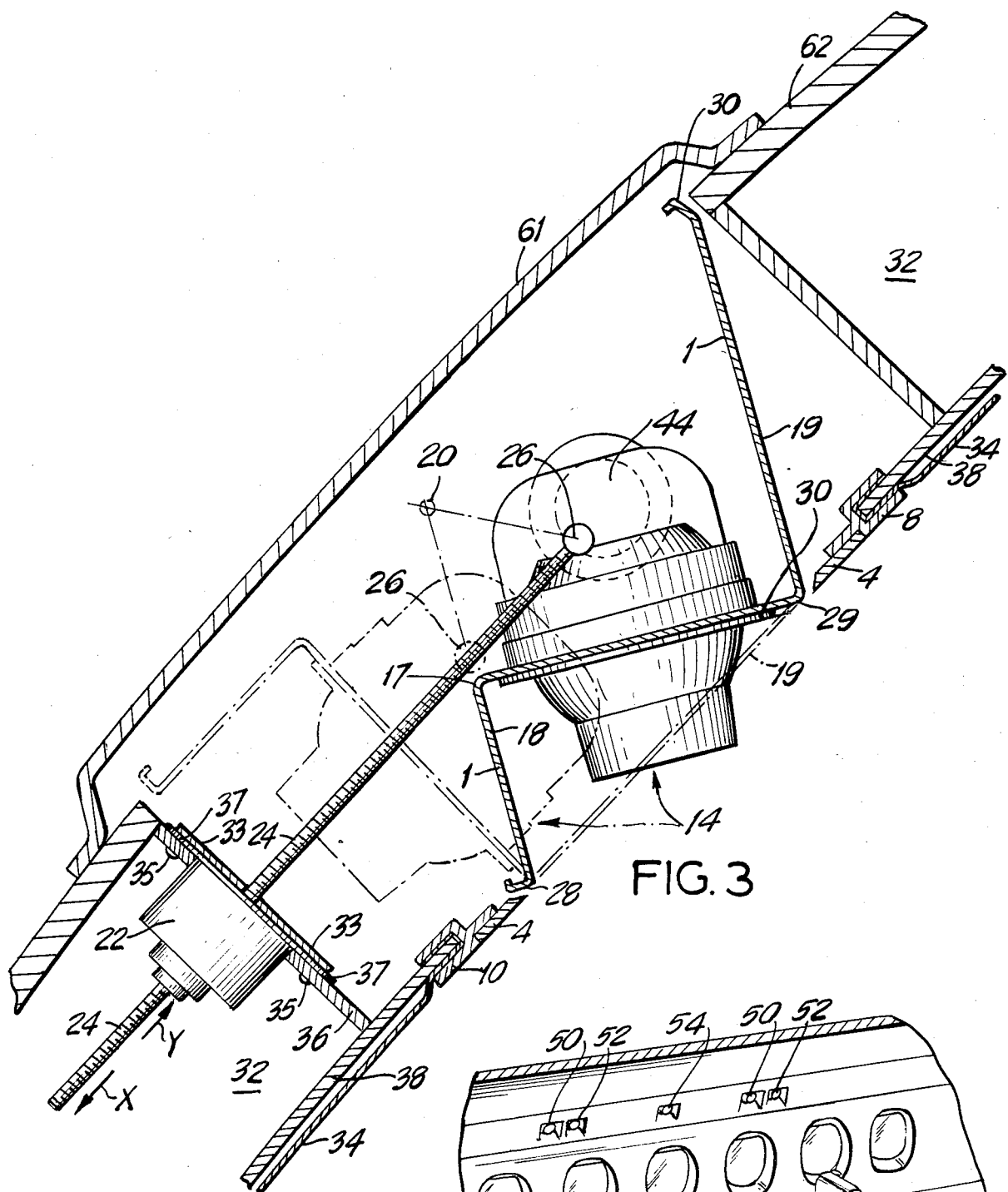
FIG. 3 is a cut-away drawing taken along line B–B' of FIG. 1 and illustrating an air outlet assembly in accordance with the instant invention.

The air outlet 14 and supporting bracket 1 of FIG. 3 are placed in an open or hidden orientation in an identical manner as is the reading light 12 of FIG. 2. Thus, when the pushrod 24 of FIG. 3 is retracted in the X direction, the air outlet 14 will likewise be pulled in the X direction by linkage attachment component 26. However, since air outlet 14 is likewise affected by pivoting support 20, as the air outlet 14 is withdrawn in the X direction, the axis thereof will shift about pivot point 20. As this process continues, the air outlet 14 will be retracted and the space between mating surfaces 4 will be substantially contiguously filled by hiding surface component 19 of planer supporting bracket 1.

Similarly, once in its hidden orientation, the air outlet 14 may be placed into its exposed orientation by advancing pushrod 24 in the Y direction shown in FIG. 3. Advancing pushrod 24 will simultaneously advance linkage attachment component 26 which further advances air outlet 14 in the Y direction. Since air outlet 14 is also acting under the influence of pivoting point 20, the axis of air outlet 14 will shift about pivot point 20 thereby exposing the air emitting end of the air outlet 14 to the passenger compartment.

FIG. 3 also illustrates air intake port 44 for providing air to the air outlet 14.

Figure 4:
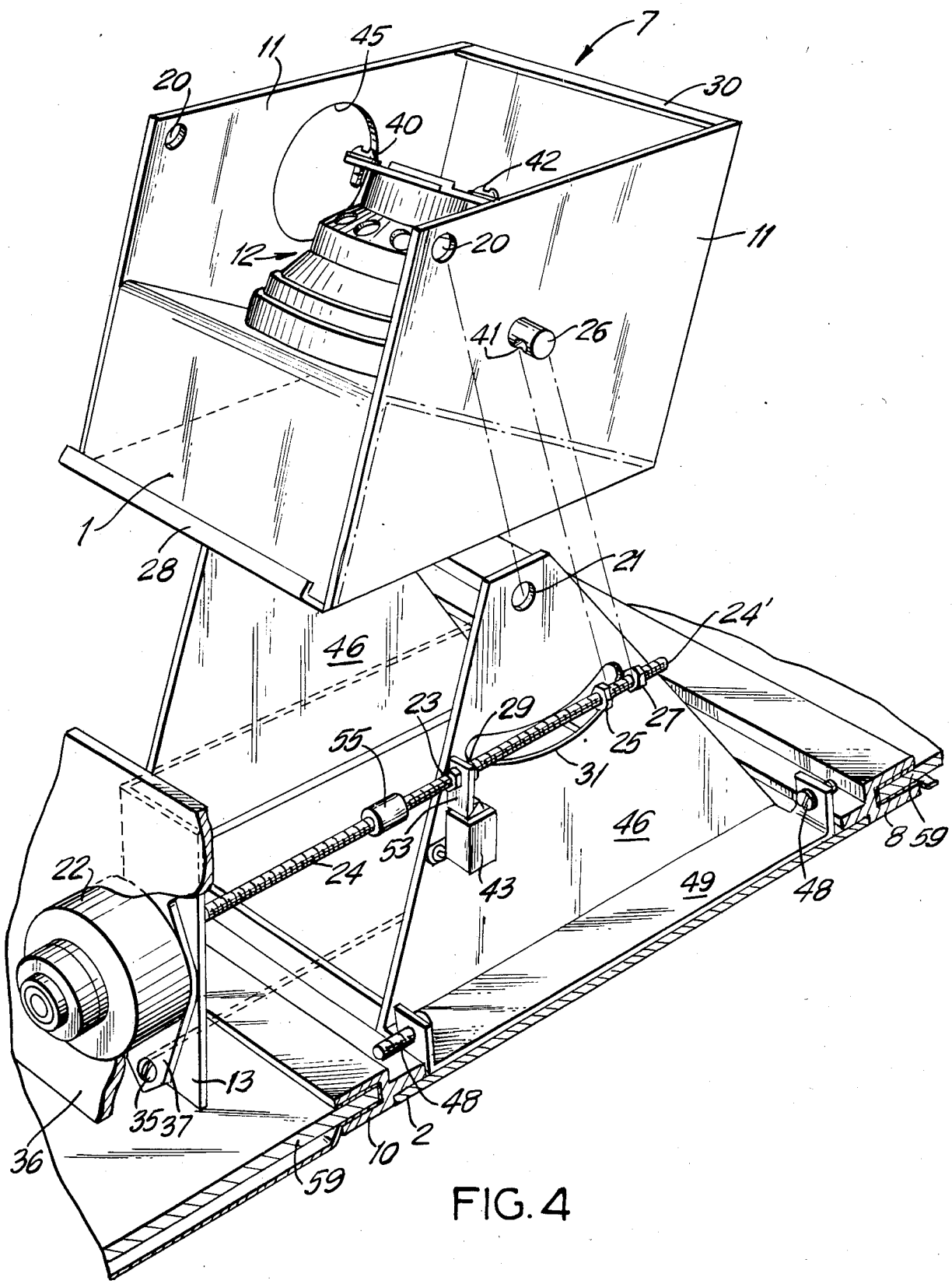
FIG. 4 is a partially exploded view of a reading light assembly according to the instant invention, including a perspective view of the actuating and linkage means.

FIG. 4 is a partially exploded side rear view of a reading light utility assembly according to the instant invention. It will first be noted that planer Z-shaped supporting member 1 is rigidly secured to sidewalls 11 forming a box-like supporting bracket for reading light 12. A mounting frame is also provided including supporting walls 46. Side walls 11 are provided with pivot point apperatures 20 which cooperate with pivot point apperatures 21 of mounting frame supporting walls 46. Pivot point apperatures 20, 21 are made to cooperate when a swinging connection, such as a rod a or screw and nut assembly, is provided therebetween.

FIG. 4 also illustrates cylindrical protrusion 26 from sidewall 11 which serves as the attachment point for the linear acuator linkage. The cylindrical protrusion 26 is provided with a bore 41 through which the pushrod 24 may pass to effect the linkage function. Locking nuts 25 and 27 are provided on opposite sides of cylindrical protrusion 26 as it is mountingly engaged on pushrod 24. These locking nuts 25, 27 allow for fine tuning of the linkage mechanism and preferably should be put to their advantage prior to installation of the assembly within the vehicular service panel.

As pushrod 24 is retracted and advanced by linear actuating means 22, cylindrical protuberance 26 is likewise advanced and withdrawn by the pushrod 24. Thus, simultaneously, the reading light 12, planer supporting member 1 and sidewalls 11, which collectively may be referred to as the lamp carrier 7, is urged forward or backward in the direction of movement of the pushrod 24. However, as discussed above, lamp carrier 7 is further acting under the influence of pivot point 20 and therefore the axis of the lamp carrier 7 swings about pivot point 20. To account for the circumferential path of cylindrical protuberance 26 as it is withdrawn and advanced by pushrod 24 under the effect of pivot point 20, an arc shaped groove 31 may be provided in frame supporting wall 46 through which the cylindrical protuberance 26 may pass for coupling to the pushrod 24 across which the cylindrical protuberance 26 may traverse as the same is being advanced and withdrawn by action of the pushrod 24 and linear actuating means 22.

As stated above, the advancing and withdrawal of the pushrod 24 causes the lamp carrier 7 to swing about pivot point 20. Concurrent with this linkage attachment 26 will depart from the linear path being urged by pushrod 24 into a somewhat circular "orbit" about pivot point 20. Pushrod 24 must therefore accomodate the pivoting motion by providing a moderate degree of bend.

Note that FIG. 4 illustrates the use of a splice 55 for joining an extended portion of rod 24' to pushrod 24. It may be necessary to splice a length of rod to pushrod 24 in some embodiments where the length of rod provided from the linear actuator is insufficient to effectuate the linkage.

Microswitch 43 secured to supporting wall 46 and tab 53 secured along pushrod 24 so as to encounter microswitch 43 may be provided with a reading light assembly according to the instant invention to cause the reading light 12 to be switched on when the reading light assembly is in its fully exposed orientation. Locking nuts 23, 29 may be provided to fine tune the switch operation prior to installation of the assembly into the service panel of the vehicle.

The wall 11 of the utility carrier 7 may be provided with an apperature 45 through which flexible tube may pass to feed an air outlet in an air outlet embodiment in accordance with the instant invention.

Although there are many possible ways of installing an assembly according to the instant invention within a wall or a ceiling of a vehicle, FIG. 4 illustrates a particular installation wherein screws 48 may be extended to fasten assembly frame bracket 49 to edge extrusions 8 and 10, the edge extrusions being permanently bonded into position about the interior wall, ceiling or surface panel 59.

To insure a tight seal between the linear actuator and the ductwork 36, the space between the actuator and the support bracket may be sealed with polysulfide during installation of the actuator means 22.

It is contemplated that retractable utility assemblys according to the instant invention may be provided with such known utility mechanisms as rotating cold air outlets, adjustable reading lights and adjustable table lights without in any way departing from the scope of the invention.

Figure 5:
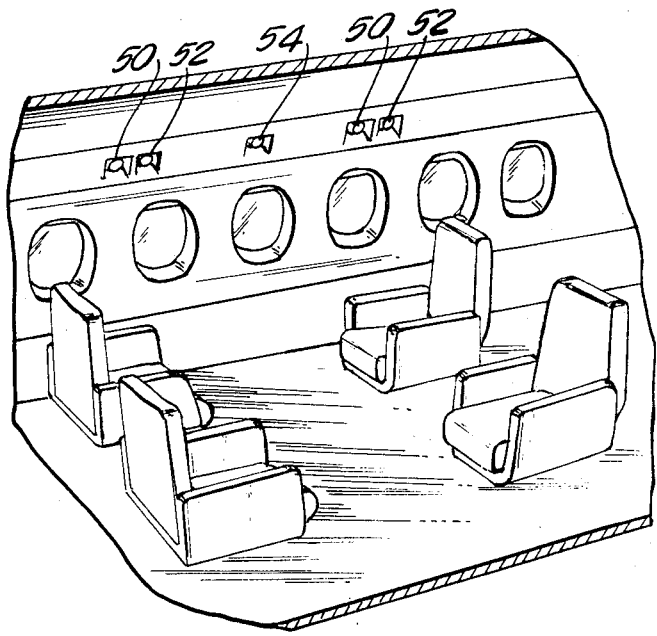
FIG. 5 is an illustration of vehicle, such as an aircraft, including light and air assemblies according to the instant invention.

FIG. 5 illustrates a vehicle, such as an aircraft, including reading light assemblys 50, air outlet assemblys 52, and a table light assembly 54, all in accordance with the instant invention.

It is contemplated that the linear actuating means, being electrically driven, may be controlled by switches on individual passenger seat panels. Such ease of access will clearly provide enhanced passenger comfort and convenience.

The materials selected by a craftsman for providing an aasembly according to the instant invention may include such materials as lightweight metals or strong plastics.

Although particular linkage and supporting means were illustrated throughout this specification, it will of course be understood that variations may be made to the particular embodiments disclosed herein without in any way departing from the spirit of the invention. For example, the utility carrier 7 of FIG. 4 need not be box shaped but instead may take on any functionally equivalent configuration. Similarly, although planer support member 1 was disclosed as being a planer member with two 90 degree bends, it may certainly be replaced by individual planer members joined at the appropriate edges to form a structure of the same or equivalent performance characteristics.

Therefore, although the foregoing has described the invention in great detail, it should not be deemed to in any way to limit the spirit of the invention or the scope of the claims which follow.

We claim:

1. A utility assembly, comprising:
   a housing having an opening therein;
   a utility mechanism to provide light or air functions;
   a substantially Z-shaped support member pivotally supported at least partially within said housing, said utility mechanism being mounted in the cross member extending between the substantially parallel members of the Z-shaped member, one of said substantially parallel members mating with said opening to substantially close the opening whereby when the opening is closed the utility mechanism is enclosed within the housing; and
   linear movement means cooperating with said Z-shaped support member for causing said Z-shaped support member to pivot in such a manner that said Z-shaped support member pivots to expose the utility mechanism through said opening.

2. A utility assembly, as recited in claim 1, wherein the other one of said parallel members and said cross member form a substantially L-shaped indentation which extends substantially from opposite edges of said housing about said opening, inwardly into said housing when said utility mechanism is exposed.

3. A utility assembly as recited in claim 2, further comprising parallel side walls secured along the edges of said substantially Z-shaped support member such that when said utility mechanism is exposed, said cross member, the other one of said parallel members and portions of both of said parallel side walls form a continuous indentation which extends substantially from the edges of said housing about said opening inwardly into said housing.

4. A utility assembly, as recited in claim 1, wherein said linear movement means includes linear actuating means, a pushrod extending from said linear actuating means, and adjustable linkage means for cooperating with said Z-shaped support, wherein operation of said linear actuating means causes said pushrod to be linearly advanced and retracted causing said Z-shaped support to correspondingly pivot.

5. A utility assembly, as recited in claim 4, wherein moving said pushrod in one direction causes the Z-shaped support to pivot such that the utility mechanism is exposed through said opening and wherein moving the pushrod in the opposite direction causes the Z-shaped support to pivot such that the opening is substantially closed by the said mating one of the parallel members of the Z-shaped member.

6. A utility assembly, as recited in claim 4, wherein said utility mechanism is a light fixture.

7. A utility assembly, as recited in claim 6, further including switch means engageable with said pushrod to switch on the light mechanism when the utility is exposed through said opening.

8. A utility mechanism, as recited in claim 1, wherein the utility mechanism is an air outlet.

* * * * *